United States Patent Office 3,121,321
Patented Feb. 18, 1964

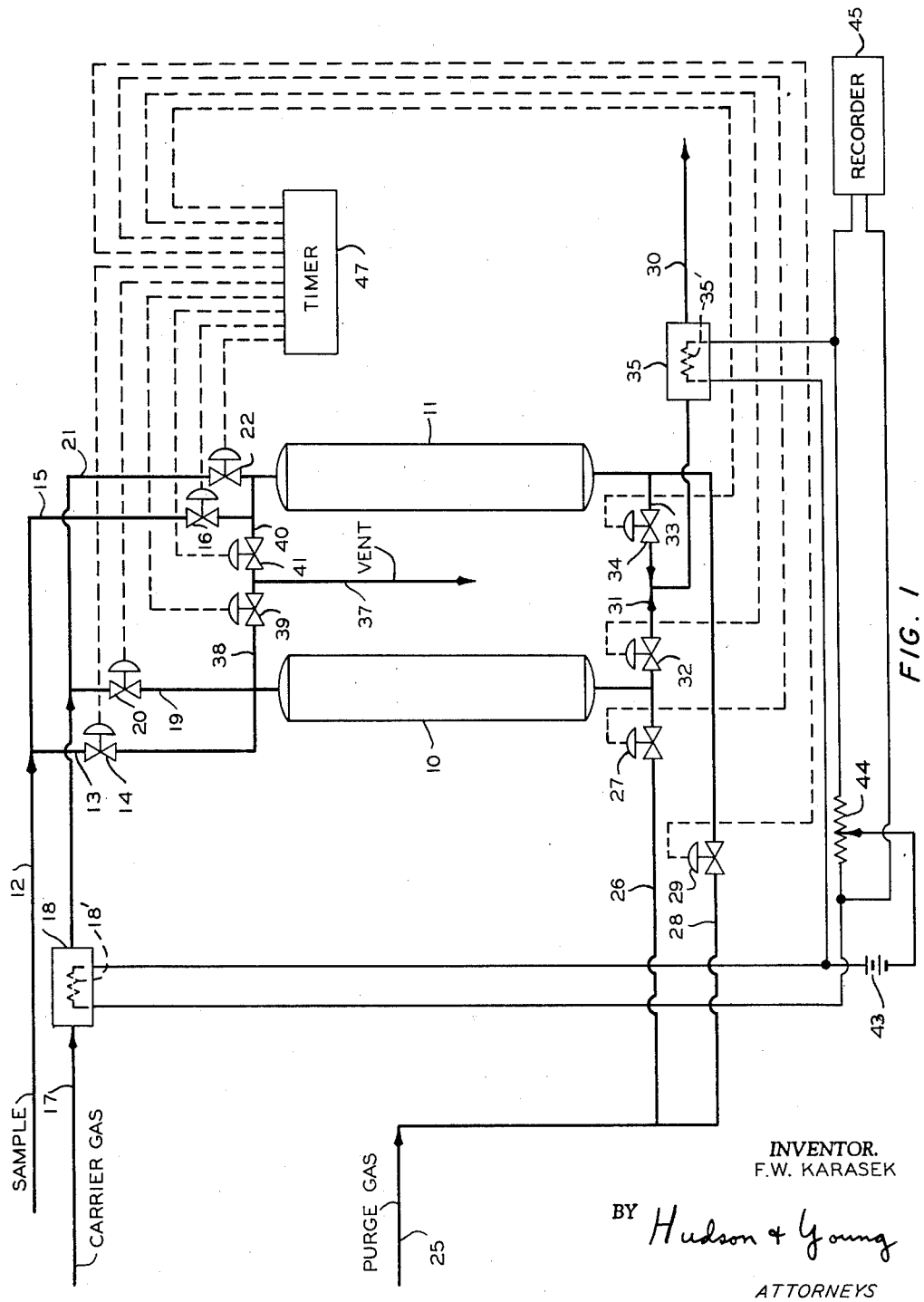

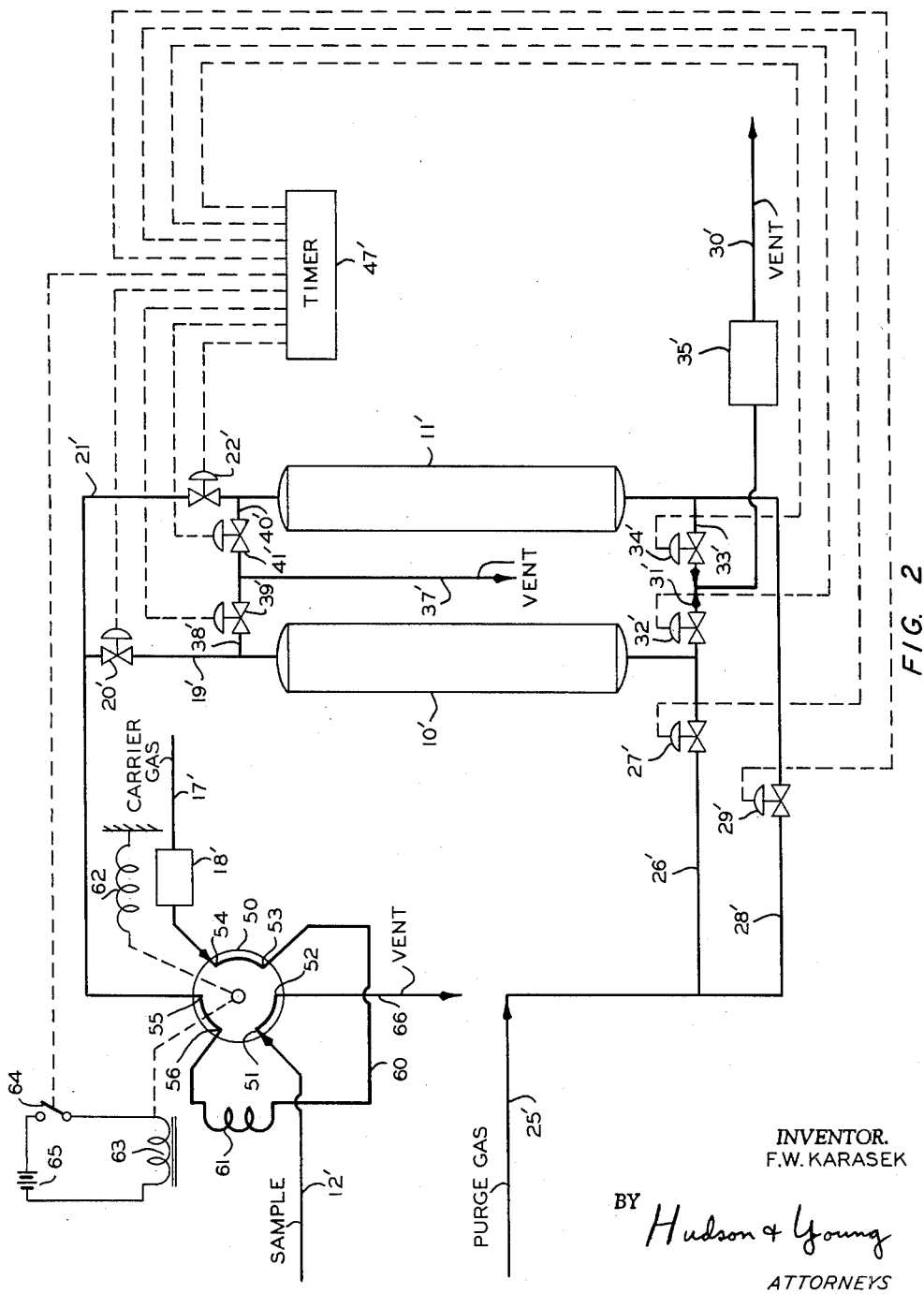

3,121,321
CHROMATOGRAPHIC ANALYSIS
Francis W. Karasek, Bartlesville, Okla., assignor to Phillips Petroleum Company, a corporation of Delaware
Filed May 19, 1958, Ser. No. 736,299
2 Claims. (Cl. 73—23)

This invention relates to the analysis of fluid streams to determine the concentration of constituents present therein.

In various industrial and laboratory operations, there is a need for analysis procedures which are capable of measuring small concentrations of constituents in fluid mixtures. One analysis procedure which presently is becoming quite valuable for fluid analysis involves elution chromatograph. In elution chromatography, a sample of the fluid mixture to be analyzed is introduced into a column which contains a material which selectively retards passage therethrough of the constituents of the mixture. A carrier gas is directed into the column so as to force the sample through the column. The column packing material attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone, the individual constituents of the fluid mixture appearing at later spaced time intervals. It is common practice to detect these constituents by means of a thermal conductivity analyzer which compares the thermal conductivity of the effluent gas with the thermal conductivity of the carrier gas directed to the column.

While analyzers of this type have proved to be quite valuable in the analysis of fluid mixtures, the time required for a complete analysis often is excessive. For example, it may require as long as 10 minutes to analyze a sample mixture containing 4 or 5 constituents. In accordance with the present invention, a novel procedure is provided whereby the column is purged immediately after the constituent or constituents of interest appear in the effluent. This procedure can shorten the analysis time considerably in some instances. A plurality of columns can be employed so that analyses are provided almost continuously by directing the sample to a second column when the first column is being purged.

Accordingly, it is an object of this invention to provide an improved method of chromatographic analysis which is capable of performing a series of analyses in rapid sequence.

Another object is to provide a method of chromatographic analysis which is capable of detecting constituents of fluid mixtures which are present in small concentrations.

A further object is to provide a novel method for performing fluid sample analyses utilizing principles of chromatography.

Other objects, advantages and features of this invention should become apparent from the following detailed description which is taken in conjunction with the accompanying drawing in which:

FIGURE 1 is a schematic representation of a first embodiment of the analyzer of this invention.

FIGURE 2 is a schematic representation of a second embodiment of the analyzer of this invention.

Referring now to the drawing in detail, and to FIGURE 1 in particular, there are shown first and second chromatographic columns 10 and 11. These columns are filled with material or materials which selectively retard passage therethrough of the individual constituents of a fluid mixture to be analyzed. Examples of suitable materials which can be employed for this purpose include adsorbents such as a molecular sieve material comprising a dehydrated zeolite, silica gel, and alumina, and a partition material such as an inert crushed solid coated by a solvent such as hexadecane, benzyl ether, and a silicone oil. A fluid sample to be analyzed is introduced into the system through a conduit 12 which communicates with the inlet of column 10 through a conduit 13, the latter having a control valve 14 therein. Conduit 12 also communicates with the inlet of column 11 through a conduit 15 which has a control valve 16 therein. A carrier gas is introduced into the system through a conduit 17 which has a thermal conductivity cell 18 disposed therein. Conduit 17 communicates with the inlet of column 10 through a conduit 19 which has a control valve 20 therein. Conduit 17 also communicates with the inlet of column 11 through a conduit 21 which has a control valve 22 therein. Examples of carrier gases which can be employed include helium, hydrogen, nitrogen, argon, air and steam. The particular carrier gas employed and the particular material or materials employed in the columns depend to a large extent upon the composition of the sample to be analyzed.

A purge gas is introduced into the system through a conduit 25. This purge gas can be, and preferably is, the same as the carrier gas. It is generally desirable that the purge gas be supplied at a greater rate than the carrier gas in order to speed the purging operation. Conduit 25 communicates with the outlet of column 10 through a conduit 26 which has a control valve 27 therein. Conduit 25 also communicates with the outlet of column 11 through a conduit 28 which has a control valve 29 therein. The outlet of column 10 is connected to a vent conduit 30 through a conduit 31 which has a control valve 32 therein. The outlet of column 11 is connected to vent conduit 30 through a conduit 33 which has a control valve 34 therein. A second thermal conductivity cell 35 is disposed in vent conduit 30. The inlet of column 11 is connected to a second vent conduit 37 through a conduit 38 which has a control valve 39 therein. The inlet of column 11 is also connected to vent conduit 37 through a conduit 40 which has a control valve 41 therein.

Thermal conductivity cells 18 and 35 have respective temperature sensitive resistance elements 18' and 35' disposed therein in thermal contact with the gases flowing through the cells. First terminals of resistance elements 18' and 35' are connected to one another and to the first terminal of a voltage source 43. The second terminals of resistance elements 18' and 35' are connected to the respective end terminals of a potentiometer 44. The contactor of potentiometer 44 is connected to the second terminal of voltage source 43. The second terminals of resistance elements 18' and 35' are also connected to the respective input terminals of a recorder 45. It should be evident that resistance elements 18' and 35' and the two halves of potentiometer 44 constitute a Wheatstone bridge network which measures differences between the resistances of elements 18' and 35' that are representative of differences between the thermal conductivities of the gases flowing past these two elements. This provides an indication of the composition of the effluent gas from columns 10 and 11 during the analysis cycle.

Control valves 14, 20, 39, 41, 16, 27, 29, 32 and 34 are actuated in the sequence described hereinafter by means of a timer 47. This timer can comprise a plurality of cam-operated switches which serve to open and close the control valves. The cams can be mounted on the drive shaft of a constant speed motor, for example.

In the normal operation of the analyzer, a sample of the material to be analyzed is first introduced into one of the columns which previously has been purged. This sample is first introduced into column 10, for example. Carrier gas is then directed through column 10 to force the constituents of the sample mixture selectively toward the column outlet. These constituents are detected in sequence by a comparison of the resistances of the two elements in cells 18 and 35. As soon as the constituent of interest is measured, the flow of carrier gas is terminated and purge gas is introduced into column 10 through conduit 26 to force the remaining constituents of the sample out of the column inlet and to vent through conduit 37. During the time that column 10 is being purged, a second analysis is performed in column 11. If the purge time is substantially longer than the analysis time, additional columns can be provided to perform the analyses while the remaining columns are being purged.

The sequence of operation of the control valves to perform analyses alternately in the two columns is set forth in the following table.

| Time | Valve Position | | | | | | | | | |
|---|---|---|---|---|---|---|---|---|---|---|
| | 14 | 16 | 20 | 22 | 39 | 41 | 27 | 29 | 32 | 34 |
| Sample in Column 10 ($t_0$) | Open | Closed | Closed | Closed | Closed | Open | Closed | Open | Open | Closed. |
| Carrier in Column 10 ($t_1$) | Closed | do | Open | do | do | do | do | do | do | Do. |
| Purge in Column 10 ($t_2$) | do | do | Closed | do | Open | do | Open | do | Closed | Do. |
| Sample in Column 11 ($t_3$) | do | Open | do | do | do | Closed | do | Closed | do | Open. |
| Carrier in Column 11 ($t_4$) | do | Closed | do | Open | do | do | do | do | do | Do. |
| Purge in Column 11 ($t_5$) | do | do | do | Closed | do | Open | do | Open | do | Closed. |

In some operations it is desirable to measure the concentration of constituents of a sample mixture which are present in extremely small concentrations. One example of such a situation involves measuring small concentrations of carbon monoxide in a fluid mixture containing a major part of ethylene and minor parts of hydrogen, oxygen, nitrogen and methane, in addition to the carbon monoxide. In such an analysis, the columns preferably contain two separate packing materials. The inlet regions of the columns contain a molecular sieve material and the outlet regions contain activated charcoal. As a specific example, the columns each comprise 15 feet of ¼ inch stainless steel tubing. The first 9 feet of the columns are filled with 16 to 20 mesh molecular sieve material and the last 6 feet are filled with 60 to 80 mesh activated charcoal. A 800 milliliter sample of the gas to be analyzed is first introduced into column 10 (time $t_0$). Helium is then introduced into the column as carrier gas at a rate of approximately 30 cubic centimeters per minute (time $t_1$). The column is maintained at a temperature of approximately 50° C. Sufficient molecular sieve material is employed so that all of the constituents of the sample initially are adsorbed. The carrier gas tends to force the constituents other than ethylene into the outlet region which contains the charcoal. The ethylene is displaced slightly, but not as rapidly as the other constituents. The charcoal selectively retards passage of the remaining constituents through the column so that carbon monoxide appears among the first trace components in the column effluent. As soon as this constituent is analyzed, column 10 is purged by passing helium back through the column as the purge gas (time $t_2$). In this manner, it is possible to detect extremely small concentrations of carbon monoxide in fluid mixtures.

In FIGURE 2 there is shown a second embodiment of the chromatographic analyzer of this invention which utilizes a rotary valve to insert predetermined volumes of the sample fluid into the two columns in sequence. The apparatus of FIGURE 2 is similar in many respects to that of FIGURE 1 and corresponding elements are designated by like primed reference numerals.

The apparatus of FIGURE 2 incorporates a rotary sample inlet valve which comprises a rotatable plate 50 having spaced ports 51, 52, 53, 54, 55 and 56. These ports are spaced uniformly about plate 50 approximately 60° from one another. When plate 50 is in the position illustrated, sample inlet conduit 12' communicates with port 51 and carrier gas inlet conduit 17' communicates with port 54. A conduit 60, which has a loop 61 therein, communicates between ports 53 and 56. A vent conduit 66 communicates with port 52. Conduit 21' communicates with port 55 to introduce fluid into columns 10' and 11'.

Valve plate 50 normally is retained in the position shown by means of a spring 62. A solenoid 63 is connected to the valve plate so that the plate is rotated 60° in one direction against the force of spring 62 when the solenoid is energized. Spring 62 returns the valve plate to the illustrated position when the solenoid is deenergized. Solenoid 63 is connected through a switch 64 to a current source 65. Switch 64 is operated by a timer 47' which corresponds generally to timer 47 of FIGURE 1.

At the beginning of the analysis cycle, valve plate 50 is in the position illustrated. Valve 20' is opened so that carrier gas from conduit 17' flows through loop 61 and into column 10' through conduit 19'. Switch 64 is then closed so that solenoid 63 rotates plates 50 by 60°. This directs the sample fluid from conduit 12' through loop 61 to vent conduit 66. After a short time interval, switch 64 is opened so that solenoid 63 is deenergized and valve plate 50 is returned to the position illustrated. The carrier gas then displaces the sample trapped in loop 61 into column 10'. The continued flow of carrier gas through column 10' tends to force the constituents of the sample through the column at rates which depend upon the affinities of the constituents of the packing material with column 10'. When the analysis is completed, column 10' is purged by the gas which is introduced through conduit 25' in the manner previously described. A sample is introduced into column 11' at a later time and the analyses are repeated alternately in the two columns. This rotary valve apparatus permits much smaller volumes of a sample gas to be introduced into the columns.

In view of the foregoing description, it should be evident that the method of this invention permits a series of fluid analyses to be performed in a much more rapid manner that has been possible heretofore. This is accomplished by purging the columns immediately after the constituent or constituents of interest are detected in the column effluent.

While the invention has been described in conjunction with present preferred embodiments, it should be evident that it is not limited thereto.

What is claimed is:
1. A method for continuously analyzing a fluid mixture to determine the concentration of at least one component thereof which comprises directing a first sample of a fluid mixture to be analyzed to the inlet of a first zone containing material that selectively retards passage therethrough of the constituents of said fluid mixture, directing a carrier gas to the inlet of said first zone at a first rate tending to force the constituents of said fluid mixture through said first zone, measuring a property of the effluent gas from the outlet of said first zone which is representative of the composition of a desired component thereof, terminating the flow of said carrier gas into said first zone, directing a second sample of a fluid mixture to the inlet of a second zone which contains material that selectively retards passage therethrough of the constituents of said fluid mixture, directing a carrier gas to the inlet of said second zone to force the constituents of said fluid mixture through said second zone while directing a purge gas into said first zone at a second rate which is greater than said first rate after at least one of the constituents of said first sample has passed through said first zone but before all of the constituents of said sample gas have passed through said first zone and measuring a property of the effluent gas from the outlet of said second zone which is representative of the composition of a desired component thereof.

2. The method of claim 1 wherein said purge gas and said carrier gas are the same.

References Cited in the file of this patent

UNITED STATES PATENTS

| | | |
|---|---|---|
| 2,757,541 | Watson et al. | Aug. 7, 1956 |
| 2,833,151 | Harvey | May 6, 1958 |
| 2,868,011 | Coggeshall | Jan. 13, 1959 |
| 2,981,092 | Marks | Apr. 25, 1961 |

OTHER REFERENCES

Aplication of Gas Liquid Partition Chromatography, by Callear et al., published in "Canadian Journal of Chemistry," vol. 33, pages 1256–1267, July 1955.

Gas Partition Analysis of Light Ends in Gasolines, by Lichtenfels et al., published in "Analytical Chemistry," vol. 28, pages 1376–1379, September 1956.